(12) United States Patent
Gschwind

(10) Patent No.: US 10,891,130 B2
(45) Date of Patent: *Jan. 12, 2021

(54) IMPLEMENTING A RECEIVED ADD PROGRAM COUNTER IMMEDIATE SHIFT (ADDPCIS) INSTRUCTION USING A MICRO-CODED OR CRACKED SEQUENCE

(71) Applicant: International Business Machines Corporation, Armonk, NY (US)

(72) Inventor: Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/111,873

(22) Filed: Aug. 24, 2018

(65) Prior Publication Data

US 2018/0365011 A1 Dec. 20, 2018

Related U.S. Application Data

(63) Continuation of application No. 15/053,419, filed on Feb. 25, 2016, now Pat. No. 10,061,580.

(51) Int. Cl.
*G06F 9/30* (2018.01)
*G06F 9/355* (2018.01)
*G06F 8/41* (2018.01)

(52) U.S. Cl.
CPC ............ *G06F 9/30032* (2013.01); *G06F 8/41* (2013.01); *G06F 9/3557* (2013.01)

(58) Field of Classification Search
None
See application file for complete search history.

(56) References Cited

U.S. PATENT DOCUMENTS 5,895,498 A * 4/1999 Ueno ........................ G06F 7/57
708/490
6,035,386 A 3/2000 Christie et al.
(Continued)

OTHER PUBLICATIONS

List of IBM Patents or Patent Applications Treated as Related; (Appendix P), Filed Aug. 24, 2018; 2 pages.

(Continued)

*Primary Examiner* — Eric Coleman
(74) *Attorney, Agent, or Firm* — Cantor Colburn LLP; Steven Chiu

(57) ABSTRACT

A computer program product for implementing a received add program counter immediate shift (ADDPCIS) instruction using a micro-coded or cracked sequence is provided. The computer program product includes a computer readable storage medium having program instructions embodied therewith. The program instructions are readable and executable by a processing circuit to cause the processing circuit to recognize register operand and integer terms associated with the ADDPCIS instruction, set a value of a target register associated with the ADDPCIS instruction in accordance with the integer term summed with another term by obtaining a next instruction address (NIA), moving an architecturally defined register file from a first temporary register to a general purpose register and adding a shifted immediate constant to a value stored in a second temporary register.

16 Claims, 8 Drawing Sheets

(56) References Cited

U.S. PATENT DOCUMENTS

| | | |
|---|---|---|
| 6,289,444 B1 * | 9/2001 | Nair .................. G06F 9/3806 |
| | | 712/243 |
| 6,351,801 B1 | 2/2002 | Christie et al. |
| 7,802,076 B2 | 9/2010 | Almog et al. |
| 7,889,204 B2 | 2/2011 | Hansen et al. |
| 8,601,239 B2 | 12/2013 | Yoshida et al. |
| 10,379,861 B2 | 8/2019 | Whittaker |
| 2004/0003209 A1 * | 1/2004 | Mitsuishi ............ G06F 9/30018 |
| | | 712/225 |
| 2004/0148497 A1 * | 7/2004 | Vahidsafa .............. G06F 9/321 |
| | | 712/239 |
| 2005/0228965 A1 * | 10/2005 | Sonzogni ............ G06F 12/109 |
| | | 711/203 |
| 2008/0313446 A1 * | 12/2008 | Yokoi .................... G06F 9/322 |
| | | 712/239 |
| 2009/0204791 A1 | 8/2009 | Luick |
| 2013/0086362 A1 * | 4/2013 | Gschwind ................ G06F 9/30 |
| | | 712/205 |
| 2014/0095833 A1 | 4/2014 | Gschwind et al. |
| 2014/0365751 A1 * | 12/2014 | Caulfield ............ G06F 9/30043 |
| | | 712/224 |
| 2015/0227366 A1 | 8/2015 | Sudhakar |
| 2017/0249147 A1 | 8/2017 | Gschwind et al. |
| 2017/0249148 A1 | 8/2017 | Gschwind et al. |
| 2018/0267798 A1 | 9/2018 | Grisenthwaite et al. |

OTHER PUBLICATIONS

Michael K. Gschwind et al., "Implementing a Received Add Program Counter Immediate Shift (ADDPCIS) Instruction Using a Micro-Coded or Cracked Sequence", U.S. Appl. No. 16/111,858, filed Aug. 24, 2018.

Hu, et al.: "Using Dynamic Binary Translation to Fuse Dependent Instructions," Proceedings of the International Symposium on Code Generation and Optimization (CGO'04), IEEE Computer Society, pp. 1-12, 2004.

Krishnaswamy, et al.: "Dynamic Coalescing for 16-Bit Instructions," ACM Transactions on Embedded Computing Systems, v.4, n.1, Feb. 2005, pp. 3-37.

* cited by examiner

FIG. 7A addpcis    RT,RA,SI

| TBD | RT | RA | SI |
|---|---|---|---|
| 0 | 6 | 11 | 16 | 31 |

FIG. 7B if RA = 0 then RT ← NIA + EXTS(SI || $^{16}$0)
else           RT ← (RA) + EXTS(SI || $^{16}$0)

Let NIA be the effective address of the instruction following the *addpcis* instruction.

If RA=0, the sum NIA + (SI || 0x0000) is placed into register RT; otherwise, the (RA) + (SI || 0x0000) is placed into register RT.

Special Registers Altered:
 None

Extended Mnemonics:

Examples of extended mnemonics for *Add Immediate Shifted*.

Extended:                Equivalent to:
Subpcis Rx, value        addpcis Rx, 0, -value

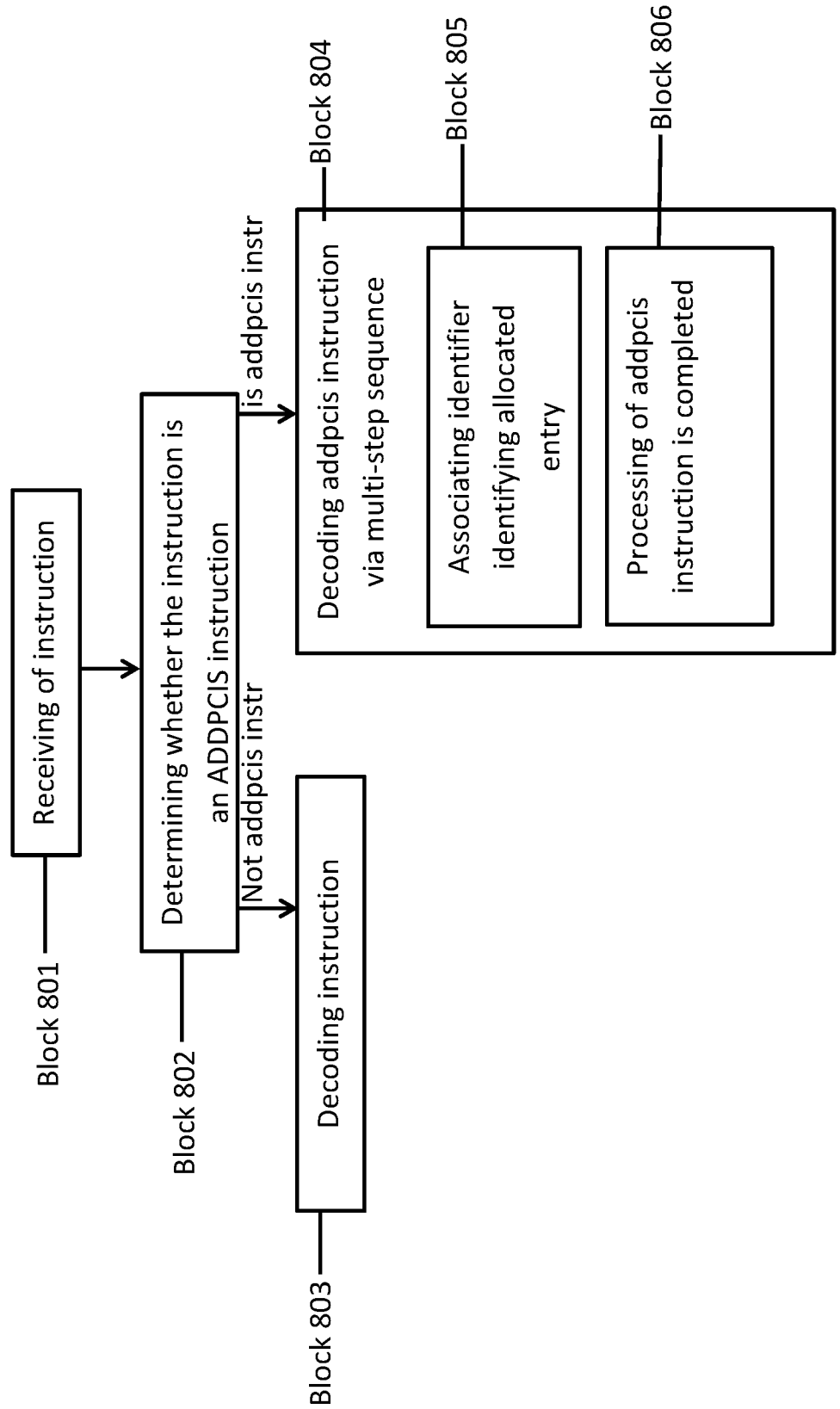

FIG. 9 pc2lctrf  elctr mfspr  eGPR, elctr addis  rt, eGPR, imm16

FIG. 10 pc2lctrf  elctr mfspr  rt, elctr

IMPLEMENTING A RECEIVED ADD PROGRAM COUNTER IMMEDIATE SHIFT (ADDPCIS) INSTRUCTION USING A MICRO-CODED OR CRACKED SEQUENCE

CROSS-REFERENCE TO RELATED APPLICATION

This application is a continuation of and claims the benefit or priority to U.S. application Ser. No. 15/053,419, which was filed on Feb. 25, 2016. The entire contents of U.S. application Ser. No. 15/053,419 are incorporated herein by reference.

BACKGROUND

The present invention relates to implementing an add program counter immediate shift (ADDPCIS) instruction and, more specifically, to methods of implementing an ADDPCIS instruction in a legacy system using a micro-coded or cracked sequence.

A program counter (PC) in a computing device is a processor register that indicates where the computing device is in its program sequence. In most processors, the PC is incremented after fetching an instruction and holds the memory address of ("points to") the next instruction that would be executed (by contrast, in a processor where incrementing precedes fetching, the PC points to a current instruction being executed). Instructions are usually fetched sequentially from memory but control transfer instructions often change the sequence by placing a new value in the PC. These include branches (sometimes called jumps), subroutine calls and returns. A transfer instruction that is conditional on the truth of some assertion lets the computer follow a different sequence under different conditions. A branch instruction provides that the next instruction is fetched from somewhere else in memory. A subroutine call not only branches but saves the preceding contents of the PC somewhere. A return retrieves the saved contents of the PC and places it back in the PC, resuming sequential execution with the instruction following the subroutine call.

A program counter in a z/Architecture® processor is generally 64 bits and can be truncated to 31 or 24 bits to support prior addressing limits. The program counter is typically embodied in a program status word (PSW) such that it persists during context switching. Thus, a program in progress, having a program counter value, may be interrupted by, for example, the operating system in an exemplary context switch from a program environment to an operating system environment. The PSW of the program maintains the program counter value while the program is not active and the program counter (in the PSW) of the operating system is used while the operating system is executing. Typically, the program counter is incremented by an amount equal to the number of bytes of a current instruction.

SUMMARY

According to an embodiment of the present invention, a computer program product for implementing a received add program counter immediate shift (ADDPCIS) instruction using a micro-coded or cracked sequence is provided. The computer program product includes a computer readable storage medium having program instructions embodied therewith. The program instructions are readable and executable by a processing circuit to cause the processing circuit to recognize register operand and integer terms associated with the ADDPCIS instruction, set a value of a target register associated with the ADDPCIS instruction in accordance with the integer term summed with another term by obtaining a next instruction address (NIA), moving an architecturally defined register file from a first temporary register to a general purpose register and adding a shifted immediate constant to a value stored in a second temporary register.

According to another embodiment of the present invention, a computing system for implementing a received add program counter immediate shift (ADDPCIS) instruction using a micro-coded or cracked sequence is provided. The computing system includes a computer readable storage medium having instructions stored thereon that are executable by a processing circuit to cause the processing circuit to recognize register operand and integer terms associated with the ADDPCIS instruction, set a value of a target register associated with the ADDPCIS instruction in accordance with the integer term summed with another term by obtaining a next instruction address (NIA), moving an architecturally defined register file from a first temporary register to a general purpose register and adding a shifted immediate constant to a value stored in a second temporary register.

According to yet another embodiment of the present invention, a computer-implemented method for implementing a received add program counter immediate shift (ADDPCIS) instruction using a micro-coded or cracked sequence is provided. The computer-implemented method includes recognizing register operand and integer terms associated with the ADDPCIS instruction and setting a value of a target register associated with the ADDPCIS instruction in accordance with the integer term summed with another term by obtaining a next instruction address (NIA), moving an architecturally defined register file from a first temporary register to a general purpose register and adding a shifted immediate constant to a value stored in a second temporary register.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 7A is an exemplary embodiment of an addpcis instruction;

FIG. 7B is a schematic diagram illustrating a processing of the addpcis instruction of FIG. 7A;

FIG. 8 is a flow diagram illustrating a method of handling an instruction in accordance with embodiments;

FIG. 9 illustrates exemplary micro-code used to handle an ADDPCIS instruction; and FIG. 10 illustrates exemplary micro-code used to handle an ADDPCIS instruction.

DETAILED DESCRIPTION

As will be described below, program counter (PC) relative addressing capability is provided in order to improve data flow and to move data to where it is needed in existing micro-architectures. The capability is enabled by a multi-stage sequence that is based on an execution of an extract of the PC (e.g., in a branch execution unit) and storing a result into an intermediate micro-architectural register, a movement of the information in the micro-architectural register to a general purpose register (where the two registers are distinct) and an execution of an addition of an immediate shift into a specific target register.

Figure 1:
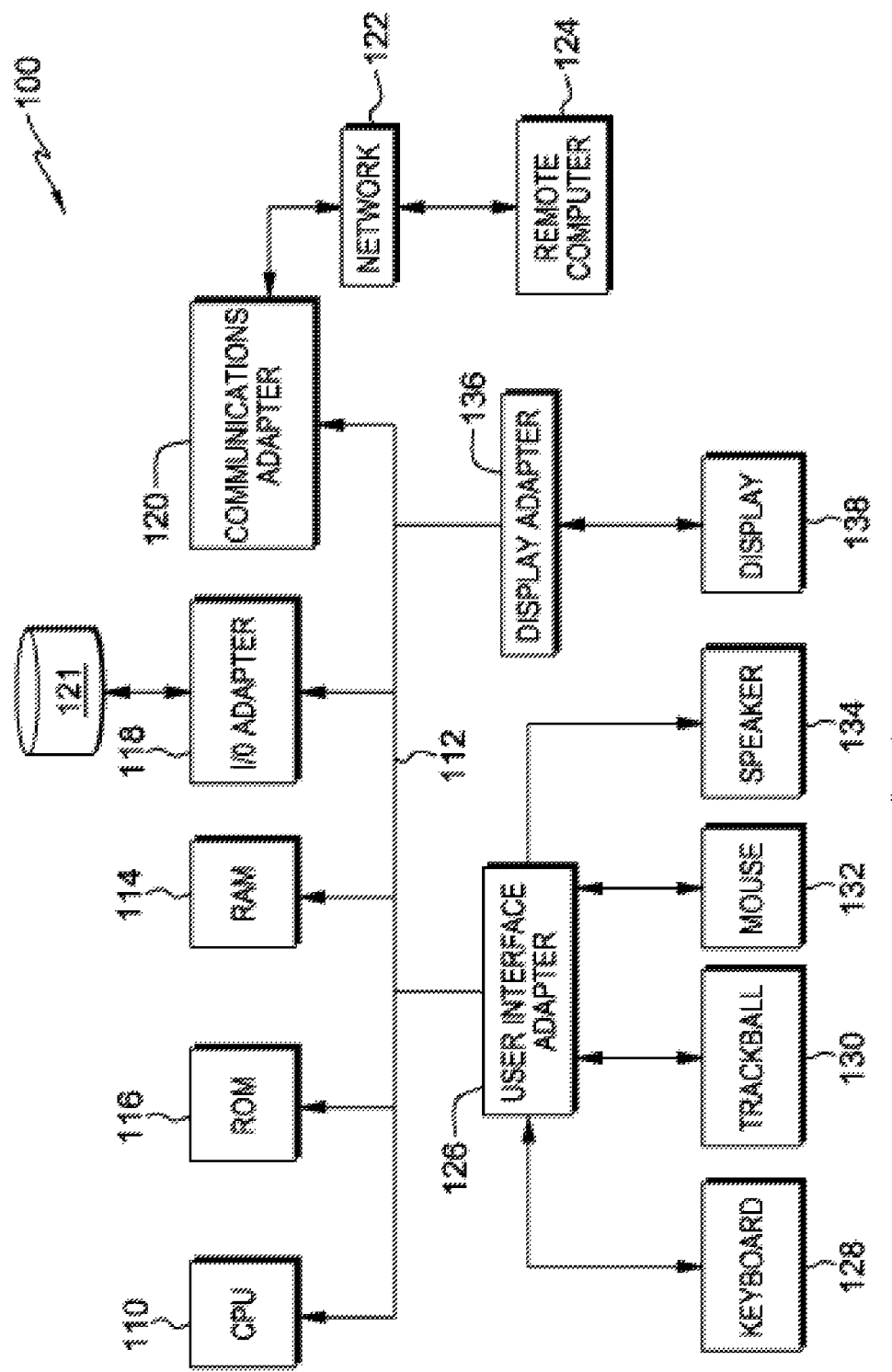
FIG. 1 is a schematic illustration of a processing environment.

With reference to FIG. 1, a processing environment 100 includes a central processing unit (CPU) or processing circuit 110, which is coupled to various other components by a bus or interconnect 112, including, for example, a read-only memory (ROM) 116 that includes a basic input/output system (BIOS) that controls certain basic functions of the processing environment, a random access memory (RAM) 114, an input/output (I/O) adapter 118, and a communications adapter 120. I/O adapter 118 may be a small computer system interface (SCSI) adapter that communicates with a storage device 121. Communications adapter 120 interfaces interconnect 112 with a network 122, which enables processing environment 100 to communicate with other systems, such as remote computer 124.

Interconnect 112 also has input/output devices connected thereto via a user interface adapter 126 and a display adapter 136. Keyboard 128, trackball 130, mouse 132 and speaker 134 are all interconnected to bus 112 via user interface adapter 126. Display 138 is connected to system bus 112 by display adapter 136. In this manner, processing environment 100 receives input, for example, through keyboard 128, trackball 130, and/or mouse 132, and provides output, for example, via network 122, on storage device 121, speaker 134 and/or display 138, as examples. The hardware elements depicted in processing environment 100 are not intended to be exhaustive, but rather represent example components of a processing environment in one embodiment.

Operation of the processing environment 100 can be controlled by program code, such as firmware and/or software, which typically includes, for example, an operating system such as AIX® (AIX is a trademark of International Business Machines Corporation) and one or more application or middleware programs. As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware. Such program code comprises instructions discussed below with reference to FIG. 2.

Figure 2:
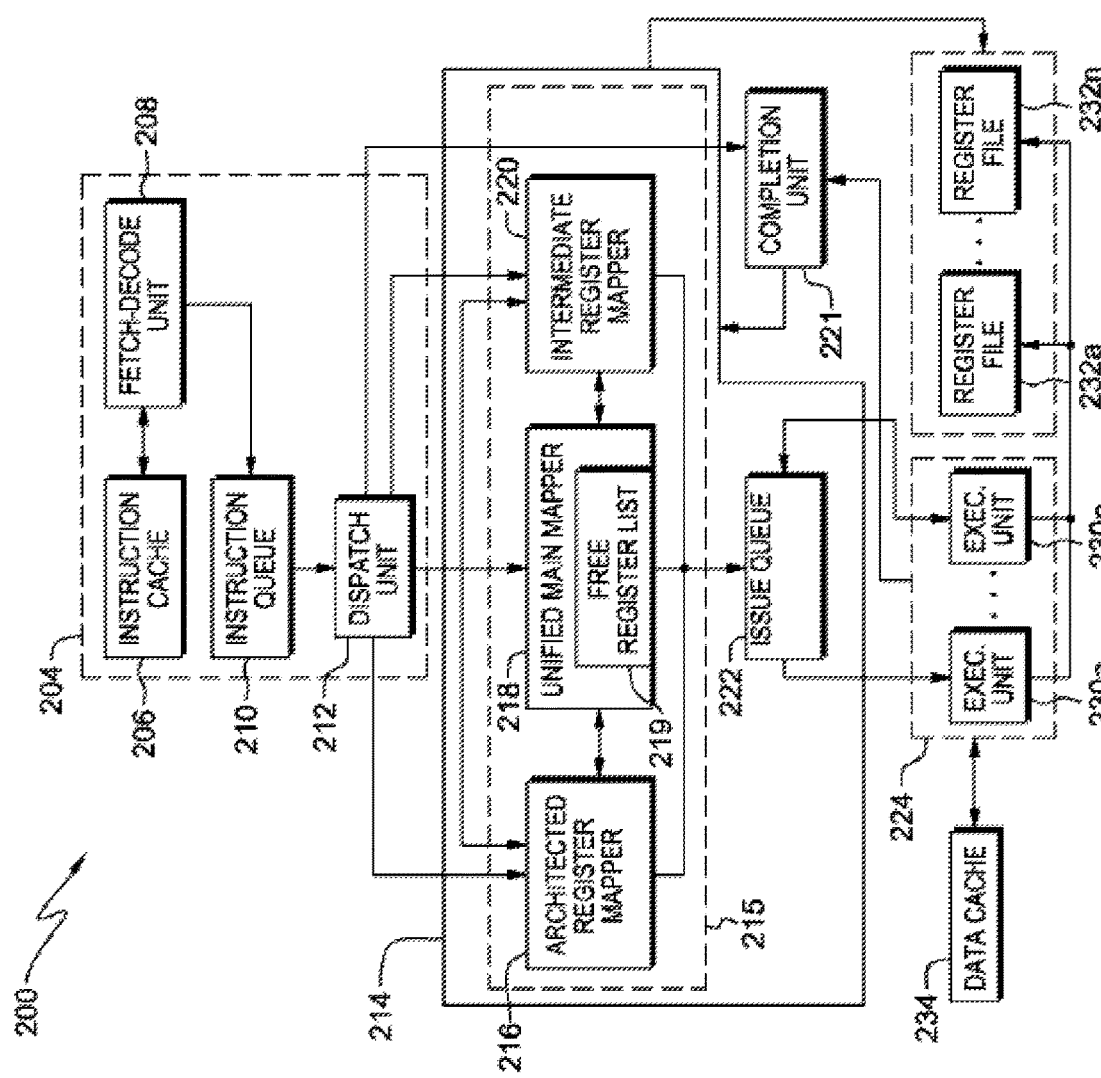
FIG. 2 is a schematic diagram of a processor of the processing environment of FIG. 1.

With reference to FIG. 2, further details of a processor 200 (e.g., processing circuit 110) of the processing environment are discussed. In one example, the processor is a super-scalar processor, which retrieves instructions from memory (e.g., RAM 114 of FIG. 1) and loads them into instruction sequencing logic (ISL) 204 of the processor. The instruction sequencing logic includes, for instance, a Level 1 Instruction cache (L1 I-cache) 206, a fetch-decode unit 208, an instruction queue 210 and a dispatch unit 212. In one example, the instructions are loaded in L1 I-cache 206 of ISL 204, and they are retained in L1 I-cache 206 until they are required, or replaced if they are not needed. Instructions are retrieved from L1 I-cache 206 and, in one embodiment, are grouped into instruction groups and decoded by fetch-decode unit 208. After decoding a current instruction, the current instruction is loaded into instruction queue 210. Dispatch unit 212 dispatches instructions from instruction queue 210 into register management unit 214, as well as completion unit 221. Completion unit 221 is coupled to general execution unit 224 and register management unit 214, and monitors when an issued instruction has completed.

When dispatch unit 212 dispatches a current instruction, unified main mapper 218 of register management unit 214 allocates and maps a destination logical register number to a physical register within physical register files 232 $a$-232 $n$ that is not currently assigned to a logical register. The destination is said to be renamed to the designated physical register among physical register files 232 $a$-232 $n$. Unified main mapper 218 removes the assigned physical register from a list 219 of free physical registers stored within unified main mapper 218. Subsequent references to that destination logical register will point to the same physical register until fetch-decode unit 208 decodes another instruction that writes to the same logical register. Then, unified main mapper 218 renames the logical register to a different physical location selected from free list 219, and the mapper is updated to enter the new logical-to-physical register mapper data. When the logical-to-physical register mapper data is no longer needed, the physical registers of old mappings are returned to free list 219. If free physical register list 219 does not have enough physical registers, dispatch unit 212 suspends instruction dispatch until the needed physical registers become available.

After the register management unit 214 has mapped the current instruction, issue queue 222 issues the current instruction to general execution engine 224, which includes execution units (EUs) 230 $a$-230 $n$. Execution units 230 $a$-230 $n$ are of various types, including, for instance, floating-point (FP), fixed-point (FX), and load/store (LS). General execution engine 224 exchanges data with data memory (e.g., RAM 114, ROM 116 of FIG. 1) via a data cache 234. Moreover, issue queue 222 may contain instructions of floating point type or fixed-point type, and/or load/store instructions. However, it should be appreciated that any number and types of instructions can be used. During execution, EUs 230 $a$-230 $n$ obtain the source operand values from physical locations in register files 232 $a$-232 $n$ and store result data, if any, in register files 232 $a$-232 $n$ and/or data cache 234.

Register management unit 214 includes, for instance: (i) mapper cluster 215, which includes architected register mapper 216, unified main mapper 218, and intermediate register mapper 220; and (ii) issue queue 222. Mapper cluster 215 tracks the physical registers assigned to the logical registers of various instructions. In one embodiment, architected register mapper 216 has 16 logical (i.e., not physically mapped) registers of each type that store the last, valid (i.e., checkpointed) state of logical-to-physical register mapper data. However, it should be recognized that different processor architectures can have more or less logical registers than described in this embodiment. Further, architected register mapper 216 includes a pointer list that identifies a physical register which describes the checkpointed state. Physical register files 232 $a$-232 $n$ typically contain more registers than the number of entries in architected register mapper 216. It should be noted that the particular number of physical and logical registers that are used in a renaming mapping scheme can vary.

In contrast, unified main mapper 218 is typically larger (typically contains up to 20 entries) than architected register mapper 216. Unified main mapper 218 facilitates tracking of the transient state of logical-to-physical register mappings. The term "transient" refers to the fact that unified main mapper 218 keeps track of tentative logical-to-physical register mapping data as the instructions are executed out-of-order (OoO). Out-of-order execution typically occurs when there are older instructions which would take longer (i.e., make use of more clock cycles) to execute than newer instructions in the pipeline. However, should an out-of-order instruction's executed result require that it be flushed for a particular reason (e.g., a branch miss-prediction), the processor can revert to the checkpointed state maintained by architected register mapper 216 and resume execution from the last, valid state.

Unified main mapper 218 makes the association between physical registers in physical register files 232 a-232 n and architected register mapper 216. The qualifying term "unified" refers to the fact that unified main mapper 218 obviates the complexity of custom-designing a dedicated mapper for each of register files 232 (e.g., general-purpose registers (GPRs), floating-point registers (FPRs), fixed-point registers (FXPs), exception registers (XERs), condition registers (CRs), etc.).

In addition to creating a transient, logical-to-physical register mapper entry of an out-of-order instruction, unified main mapper 218 also keeps track of dependency data (i.e., instructions that are dependent upon the finishing of an older instruction in the pipeline), which is used for instruction ordering. Conventionally, once unified main mapper 218 has entered an instruction's logical-to-physical register translation, the instruction passes to issue queue 222. Issue queue 222 serves as the gatekeeper before the instruction is issued to execution unit 230 for execution. As a general rule, an instruction cannot leave issue queue 222 if it depends upon an older instruction to finish. For this reason, unified main mapper 218 tracks dependency data by storing the issue queue position data for each instruction that is mapped. Once the instruction has been executed by general execution engine 224, the instruction is said to have "finished" and is retired from issue queue 222.

Register management unit 214 may receive multiple instructions from dispatch unit 212 in a single cycle so as to maintain a filled, single issue pipeline. The dispatching of instructions is limited by the number of available entries in unified main mapper 218. In some mapper systems, which lack intermediate register mapper 220, if unified main mapper 218 has a total of 20 mapper entries, there is a maximum of 20 instructions that can be in flight (i.e., not checkpointed) at once. Thus, dispatch unit 212 can conceivably dispatch more instructions than what can actually be retired from unified main mapper 218. The reason for this bottleneck at the unified main mapper 218 is due to the fact that, conventionally, an instruction's mapper entry could not retire from unified main mapper 218 until the instruction "completed" (i.e., all older instructions have "finished" executing).

However, in one embodiment, intermediate register mapper 220 serves as a non-timing-critical register for which a "finished," but "incomplete" instruction from unified main mapper 218 could retire to (i.e., removed from unified main mapper 218) in advance of the instruction's eventual completion. Once the instruction "completes," completion unit 221 notifies intermediate register mapper 220 of the completion. The mapper entry in intermediate register mapper 220 can then update the architected coherent state of architected register mapper 216 by replacing the corresponding entry that was presently stored in architected register mapper 216.

In at least some embodiments, additional register sets may be separately managed from a unified mapper resource. In at least one embodiment, this includes a set of registers operatively coupled to a branch execution unit and that in turn include registers for storing a return address, such as a link register (LR), a target address register (TAR) for storing a target address or a count register (CTR) for storing a count value for loop instructions. In at least one embodiment, one or more of these registers may be combined in a distinct register file, such as a link-count register file (LCTRF). In one embodiment, register renaming for the LCTRF is performed by the unified main mapper. In another embodiment, LCTRF registers are allocated and mapped with an auxiliary dedicated mapper for the LCTRF. In yet other embodiments, the functions of storing return addresses, loop counts and target addresses may be subsumed in another register file, such as, but not limited to, a general purpose register file or an integer register file.

Figure 3:
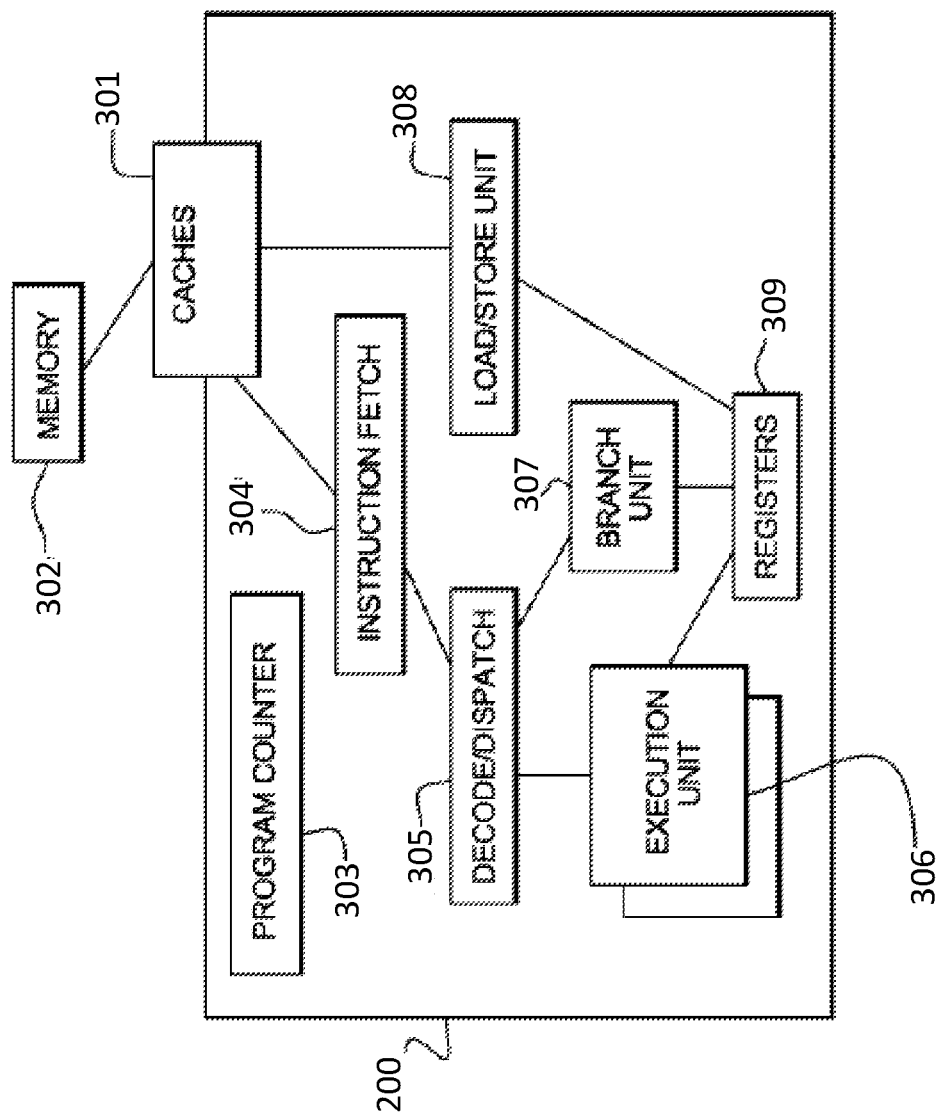
FIG. 3 is a schematic diagram of a processing circuit of the processing environment of FIG. 1.

With reference to FIG. 3, an exemplary processor embodiment is depicted for processor 200 of FIG. 2. Typically one or more levels of cache 301 are employed to buffer memory blocks in order to improve processor performance. The cache 301 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 302 of a processor system is often referred to as a cache. In a processor system having 4 levels of cache 301, main storage 302 is sometimes referred to as the level 5 (L5) cache since it is typically faster and only holds a portion of the non-volatile storage (DASD, tape etc.) that is available to a computer system. Main storage 302 "caches" pages of data paged in and out of the main storage 302 by the operating system.

A program counter (instruction counter) 303 keeps track of the address of the current instruction to be executed and, in a z/Architecture® processor, is 64 bits and can be truncated to 31 or 24 bits to support prior addressing limits. Program counter 303 is typically embodied in a program status word (PSW) of a computer such that it persists during context switching. Thus, a program in progress, having a program counter value, may be interrupted by, for example, the operating system (in a context switch from the program environment to the operating system environment). The PSW of the program maintains the program counter value while the program is not active, and the program counter (in the PSW) of the operating system is used while the operating system is executing.

Typically, the program counter 303 is incremented by an amount equal to the number of bytes of the current instruction and may be modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 303.

Instruction fetch unit 304 is employed to fetch instructions on behalf of the processor 200. The instruction fetch unit 304 either fetches "next sequential instructions", target instructions of branch taken instructions, or first instructions of a program following a context switch with the fetched instructions subsequently executed by the processor 200. In an embodiment, the fetched instruction(s) may be passed to a dispatch unit 305, which decodes the instruction(s) and forwards information about the decoded instruction(s) to execution unit 306, branch unit 307 or load/store unit 308. Execution unit 306 will typically receive information about decoded arithmetic instructions from the instruction fetch unit 304 and will perform arithmetic operations on operands according to the opcode of the instruction. Operands are provided to the execution unit 306 either from memory 302, architected registers 309 or from an immediate field of the instruction being executed. Results of the execution, when stored, are stored either in memory 302, registers 309 or in other machine hardware (such as control registers, PSW registers and the like).

Execution unit 306 may communicate with registers 309, decode/dispatch unit 305, load/store unit 308 and other processor units by way of interfacing logic. Execution unit 306 may employ several register circuits to hold information that an arithmetic logic unit (ALU) will operate on. The ALU performs arithmetic operations such as add, subtract, multiply and divide as well as logical functions such as and, or and exclusive-or (XOR), rotate and shift. The ALU may also support specialized operations that are design dependent while other circuits may provide other architected facilities including condition codes and recovery support logic for example. Typically the result of an ALU operation is held in an output register circuit which can forward the result to a variety of other processing functions.

An ADD instruction, for example, may be executed in execution unit 306 having arithmetic and logical functionality while a floating point instruction for example would be executed in a floating point execution unit having specialized floating point capability. Often execution unit 306 operates on operands identified by an instruction by performing an opcode defined function on the operands. For example, an ADD instruction may be executed by execution unit 306 on operands found in registers 309 identified by register fields of the instruction.

Figure 4:
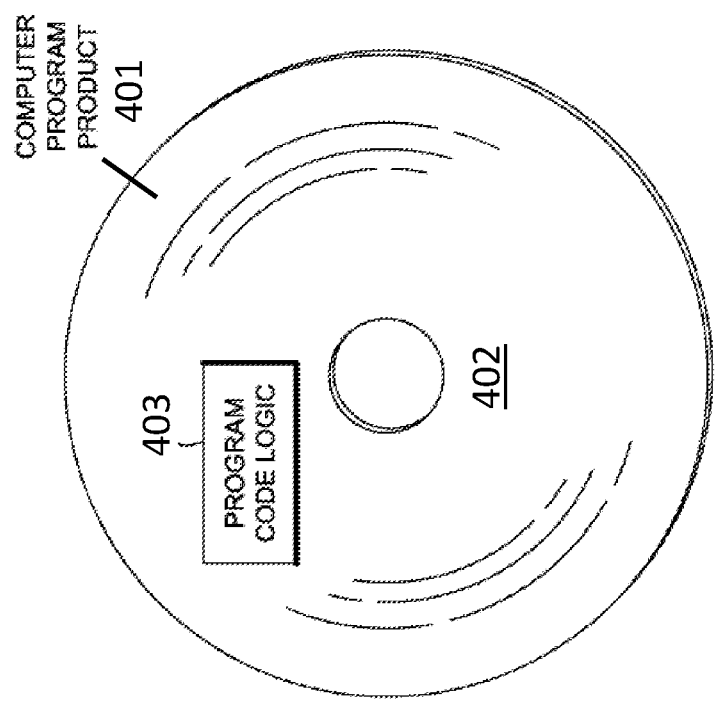
FIG. 4 is an illustration of a computer program product in accordance with embodiments.

With reference to FIG. 4, a computer program product 401 is provided and may be installed or otherwise loaded into the processing environment 100 of FIG. 1. The computer program product 401 includes one or more non-transitory computer readable storage media 402 that has computer readable program logic or program instructions 403 stored thereon. The program instructions 403 are readable and executable by the processing circuit 110 to cause the processing circuit 110 to execute the computer-implemented operations described below.

Figure 5:
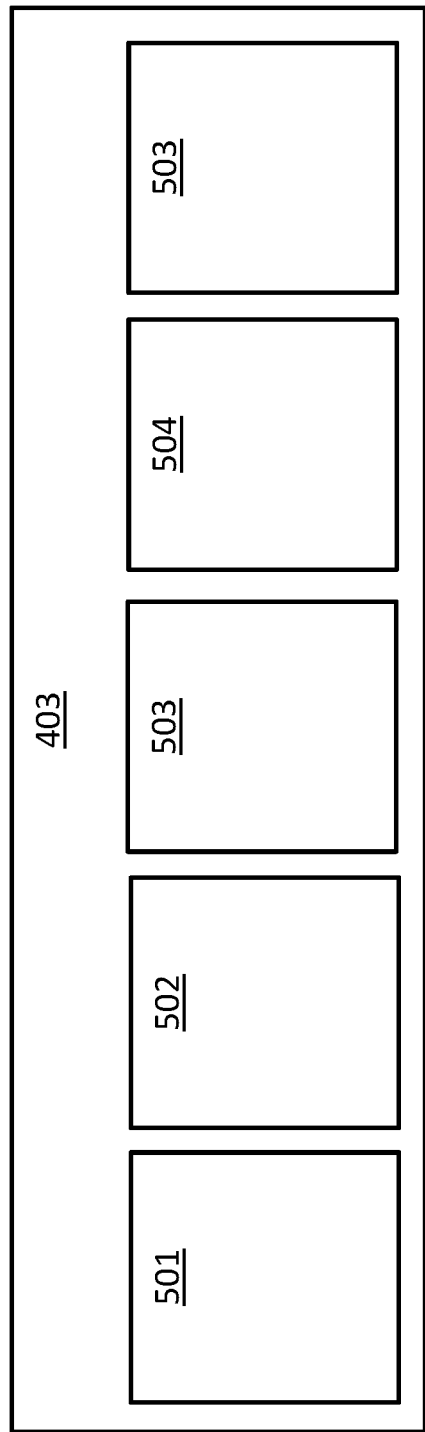
FIG. 5 is a schematic diagram of sequences of program instructions of the computer program product of FIG. 4.
Figure 6:
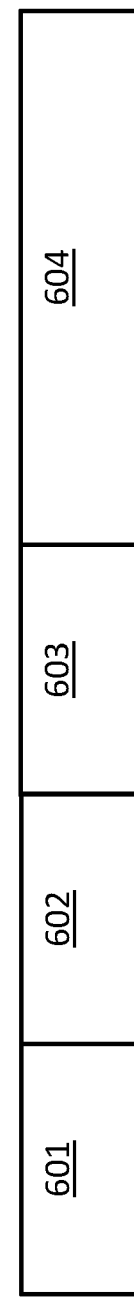
FIG. 6 is an illustration of an instruction.

With reference to FIGS. 5 and 6, the program instructions 403 may include first-fifth sequences of program instructions 501-505. The first sequence of program instructions 501 are readable and executable by the processing circuit 110 to cause the processing circuit 110 to receive an instruction and to determine whether the instruction is an ADDPCIS instruction. That is, if a line of program code generated by a programmer is input as:
    addpcis RT, RA, SI the processing circuit 110 will responsively generate the instruction as shown in FIG. 6 with an opcode field 601, which has a value that is reserved for an ADDPCIS instruction and which identifies the instruction as an ADDPCIS instruction specifically, a target register field 602, an optional register operand field 603 and a signed integer field 604. The programmer specified register number RT will be inserted in the field 602. The programmer specified register number RA will be inserted into field 603. The programmer specified signed integer value SI will be inserted in field 604. In accordance with at least one embodiment, the programmer corresponds to an automated program generated tool, such as a compiler. Furthermore, register fields RT, RA and integer field SI may be specified by the compiler based on internal compiler algorithms such as register allocation and other program optimizations.

In accordance with some aspects of the embodiment, additional programmer-specifiable instruction names and forms may be supplied, In one instance, this includes
    ADDPCIS RT, SI
    which may be translated to an instruction format by assigning the value 0 to field 603.

In accordance with another instruction name that may be supported,
    SUBPCIS RT, RA, SI
    may be translated to the same instruction form of FIG. 6 with the ADDPCIS code stored in field 601, and RT and RA stored in 602 and 603, respectively, by storing the value −SI, i.e., the negated value or two's complement, in field 604.

In accordance with yet another form,
    SUBPCIS RT, SI
    may be translated to the same instruction form of FIG. 6 with the ADDPCIS code stored in field 601, and RT stored in 602, by storing 0 in field 603 and by storing the value −SI, i.e., the negated value or two's complement, in field 604.

A definition of an addpcis instruction will now be provided with reference to FIGS. 7A and 7B.

As shown, an addpcis instruction includes an opcode, e.g., field TBD, a target register field RT, a source register field RA, and a signed immediate field SI.

The second sequence of program instructions 502 are readable and executable by the processing circuit 110 to cause the processing circuit 110 to recognize values of register operand and signed integer terms associated with the ADDPCIS instruction and to populate the register operand and signed integer fields 603 and 604 with the recognized values, respectively. The third sequence of program instructions 503 are readable and executable by the processing circuit 110 to cause the processing circuit 110 to determine whether the value of the register operand term is nil, zero or another integer and the fourth sequence of program instructions 504 are readable and executable by the processing circuit 110 to cause the processing circuit 110 to set a value of the target register field 602 in accordance with the value of the sign integer term summed with another term based on the value of the register operand term.

In accordance with embodiments, the setting of the value of the target register field 602 is conducted in one of two manners. In the first, the value of the target register field is set as equivalent to a value of a next instruction address (NIA), which is calculated by the processing circuit 110, summed with a value of the sign extended sign integer term in the signed integer field 604 concatenated with a predefined byte series (e.g., an EXTS (SI$\|^{16}$0 byte series) in an event the value of the register operand term in the register operand field 603 is determined to be nil, where the register operand field is ignored or irrelevant, or zero. The value of the register operand term in the register operand field 603 is zero in the case of the ADDPCIS instruction listed above but could and would be equal to any value used in place of the zero. In the second manner, the value of the target register field is set as being equivalent to the value of the register operand term in the register operand field 603 that is summed with the value of the sign extended sign integer term concatenated with the predefined byte series in an event the value of the register operand term in the register operand field 603 is determined to be the another integer (e.g., any integer other than zero).

Advantageously, the addpcis instruction is used to generate a PC relative index in accordance with an addressing scheme for data, wherein the location of data is identified with the distance from the current instruction (i.e., the current instruction address, the next instruction address, or another known address associated with the present instruction at a knowable distance from the present instruction). In accordance with at least one embodiment, the addpcis instruction adds a number of high order bits of the data distance from the address corresponding to the current instruction, returning a partial address for use by a second instruction. A second instruction then uses the second instruction to complete the computation of the data address, and optionally perform the data access.

In exemplary embodiments, a data item "a" may be read-accessed by two instructions as follows:

```
addpcis R5, (a - here)@ha
here:   ld      R6, R5, (a-here)@l
...
a:
.long 0x0
```

In other exemplary embodiments, a data item "a" may be write-accessed by two instructions as follows:

```
addpcis R5, (a - here)@ha
here:   std     R6, R5, (a-here)@l
...
a:
.long 0x0
```

In other exemplary embodiments, a data address of data item "a" may be computed by two instructions as follows:

```
addpcis  R5, (a - here)@ha
here:   addi    R6, R5, (a-here)@l
...
a:
.long 0x0
```

In accordance with embodiments and, with reference to FIG. 8, an instruction is implemented in a legacy processor as follows: the instruction is received at block 801 by a decode unit, such as a decode logic unit of a microprocessor and a test is performed at block 802 to determine whether the instruction is an addpcis instruction. In an event the test is negative, control proceeds to block 803 whereupon instruction decode and execution are performed. In an event the test succeeds, control proceeds to block 804 whereupon decode logic performs a multi-step sequence by generating a plurality of internal operation codes using at least one of internal operation expansion and microcode.

In the multi-step sequence, decode logic in conjunction with branch processing logic allocates an information entry in a branch information structure, e.g., a branch information queue—such as a BIQ of a microprocessor or an effective address queue, and causes an address indicative of the current instruction address to be stored in the entry so allocated. In accordance with at least one embodiment, such operations are similar to a subroutine call instruction to provide a return address for storage in a return address register, such as a link register specified by a power ISA as a register to receive a return address in a subroutine call, or a general purpose register specified by a z/Architecture call instruction to receive a return address.

At block 805, an identifier (e.g., a tag, such as a branch tag, or an effective address tag) identifying the allocated entry is associated with one of the internal operations and processing of the addpcis instruction completes in decode logic and the instructions are passed to the next pipeline stage at block 806.

In greater detail, a processing of the addpcis instruction in accordance with one embodiment of the multi-step sequence includes internal operation 1 (iop1) in which a next instruction address is obtained, iop2 in which the next instruction address is moved to a general purpose register and iop3 in which an immediate value (i.e., a value specified in the instructions) is shifted and then added to next instruction address so obtained and execution steps performed responsive to the issuing of iop1, iop2 and iop3 by an instruction sequence unit.

That is, in the first execution step, a microprocessor performs iop1 to obtain the next instruction address from a BIQ, also denoted with the mnemonic "pc2lctrf" indicating that the instruction moves the value of the program counter to the link count register file. The iop1 may be executed by branch execution logic and stores the obtained address in a temporary register of a link count register file (e.g., denoted as "elctr"—extended, or extra, link count register). In the second execution step, a move from a first temporary register of a link count register file is moved to a second temporary general purpose register (e.g., denoted as "egpr"—extended, or extra, general purpose register) of a general purpose register file. In the third execution step, a shifted immediate constant is added to the value stored in a temporary register with the result being stored in the final result register of the original addpcis instruction.

Thus, in accordance with embodiments, the actions described above begin with the receiving of the instruction and the subsequent determination of whether the instruction is an ADDPCIS instruction. In an event the instruction is determined to not be an ADDPCIS instruction, the instruction is decoded in accordance with known methods. On the other hand, in an event the instruction is an addpcis instruction, a multi-step processing sequence in microcode is initiated.

With reference to FIGS. 9 and 10, the processing circuit 110 initially responds to the reception of the ADDPCIS instruction by generating pc2lctrf and elctr micro-code instructions. The pc2lctrf micro-code instruction states that the program counter is to be moved to a link count register file and the elctr micro-code instruction defines an extended microcode link count register. Thus, the NIA is moved to a (first) temporary register based on a branch and link (subroutine call) function flow. Next, the processing circuit 110 generates mfspr and eGPR, elctr micro-code instructions. Here, the mfspr micro-code instruction relates to movement of a register from a special purpose register and the eGPR micro-code instruction relates to an extended micro-code general purpose register. Thus, the NIA is optionally moved from the first temporary register to a second temporary register if the register files for function return addresses do not correspond to the general purpose register. Lastly, the processing circuit 110 generates addis and rt, eGPR, imm16 micro-code instructions by which a displacement is added to the temporary register (or the second temporary register) and stored in a specified ADDPCIS result register.

In accordance with alternative embodiments and, as shown in FIG. 10, decode logic of the processing circuit 110 may recognize an ADDPCIS instruction in which the imm16 value is 0 and thus generates micro-code for a special move of the program counter to the target register.

With respect to the pc2lctrf micro-code, a processing sequence for pc2lctrf will now be described. Initially, an instruction address register (IAR) is copied to a register in the link count register file in a similar execution as a b1 .+4 execution of a copy return address into register. Next, a branch scan for "ADDPCIS" and conducted and an effective address table (EATAG) reference is allocated without a link allocation on stack or a branch redirect. At this point, the ADDPCIS instruction is passed to an issue queue of the branch unit 307 (see FIG. 3) whereby the EATAG is used to retrieve the IAR.

In accordance with further embodiments, concurrent cracking and merging of sequential instructions may occur. In accordance with such an exemplary embodiment, when an addpcis instruction is decoded, a further test is performed to determine whether the addpcis instruction is followed by one of a plurality of recognized "instruction merging candidates". In at least one aspect of an embodiment in accordance with an instruction merging optimization, when an instruction merging candidate is found, and a source operand of an instruction merge candidate corresponds to a target register of an addpcis instruction, then a third iop3 of an addpcis execution sequence may be combined with the instruction merging candidate. In an exemplary case, a sequence:

| | |
|---|---|
| addpcis | RT, imm16h |
| addi | RT, RT, imm16l | is recognized which may be executed using 3 iops corresponding to the expansion of addpcis in accordance with the method described above followed by an addi instruction as follows:

| | |
|---|---|
| pc2lctrf | elctr |
| mfspr | eGPR, elctr |
| addis | rt, eGPR, imm16h | addi rt, rt, imm16l

However, because addi is an instruction merging candidate, and the target "rt" of the addpcis instruction corresponds to the source "rt" of the addi instruction, the following internal operation sequence may be generated:

| | |
|---|---|
| pc2lctrf | elctr |
| mfspr eGPR, elctr | |
| addi rt, eGPR, EXTS(imm16h) << 16 + EXTS (imm16l) | |

However, in other embodiments, other sequences are recognized and combined. Thus, the sequence:

| | |
|---|---|
| addpcis | RT, imm16h |
| LD | RT, RT, imm16l | is recognized and implemented using micro-code as follows:

| | |
|---|---|
| pc2lctrf | elctr |
| mfspr eGPR, elctr | |
| LD rt, eGPR, EXTS(imm16h) << 16 + EXTS (imm16l). | |

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for implementing a received add program counter immediate shift (ADDPCIS) instruction using a micro-coded or cracked sequence, the computer program product comprising a non-transitory computer readable storage medium having program instructions embodied therewith, the program instructions being readable and executable by a processing circuit to cause the processing circuit to:

recognize register operand and integer terms associated with the ADDPCIS instruction; and set a value of a target register associated with the ADDPCIS instruction in accordance with the integer term summed with another term by:

obtaining a next instruction address (NIA), moving the NIA to a first temporary register of a register file and storing the NIA in the first temporary register, determining whether register files for function return addresses correspond to a general purpose register or do not correspond to the general purpose register, moving the NIA from the first temporary register to the general purpose register in an event the function return addresses correspond to the general purpose register, moving the NIA from the first temporary register to a second temporary register in an event the function return addresses do not correspond to the general purpose register, and adding a shifted immediate constant to a value stored in a second temporary register.

2. The computer program product according to claim 1, wherein the program instructions cause the processing circuit to:

obtain a next instruction address from an address table, the address table having been initialized to contain a plurality of addresses loaded by instruction logic operatively coupled to at least one of instruction fetch and instruction decode logic; and determine a specific one of the plurality of addresses using an index to select an address from the plurality of addresses in the address table.

3. The computer program product according to claim 2, wherein the program instructions further cause the processing circuit to:

assign an entry in the address table to hold a next instruction address, provide an index indicative of the entry in the address table, and store a next instruction address in the assigned entry of the address table.

4. The computer program product according to claim 3, wherein the address table is used for processing of branch instructions, at least one branch instruction corresponding to the index indicating the entry in the address table, the address table holding the next instruction address corresponding to the branch instruction, and the next instruction address corresponding to a return address of a branch instruction corresponding to performing a subroutine call.

5. The computer program product according to claim 1, wherein the program instructions further cause the processing circuit to:

receive a program instruction and determine whether the instruction corresponds to an ADDPCIS instruction, and, responsive to the determination, to generate a plurality of internal operations adapted to be directly executed by the processing circuit, the plurality of internal operations corresponding to performing one or more processing steps of executing the ADDPCIS instruction, and to allocate at least one auxiliary register in a register file corresponding to a register file holding a plurality of architected registers, the allocated auxiliary register not corresponding to an architected register.

6. The computer program product according to claim 5, wherein said plurality of internal operations comprises at least one internal operation for accessing an address table holding a plurality of addresses, the internal operation further corresponding to an index indicating a specific entry of an address table, the internal operation being further adapted to store an address from the accessed address in the auxiliary register of the register file corresponding to a register file holding a plurality of architected registers.

7. The computer program product according to claim 1, wherein the program instructions further cause the processing circuit to combine the ADDPCIS instruction with a following instruction.

8. A computing system for implementing a received add program counter immediate shift (ADDPCIS) instruction using a micro-coded or cracked sequence, the computing system comprising a non-transitory computer readable storage medium having instructions stored thereon that are executable by a processing circuit to cause the processing circuit to:

recognize register operand and integer terms associated with the ADDPCIS instruction; and set a value of a target register associated with the ADDPCIS instruction in accordance with the integer term summed with another term by:

obtaining a next instruction address (NIA), moving the NIA to a first temporary register of a register file and storing the NIA in the first temporary register, determining whether register files for function return addresses correspond to a general purpose register or do not correspond to the general purpose register, moving the NIA from the first temporary register to the general purpose register in an event the function return addresses correspond to the general purpose register, moving the NIA from the first temporary register to a second temporary register in an event the function return addresses do not correspond to the general purpose register, and adding a shifted immediate constant to a value stored in the second temporary register.

9. The computing system according to claim 8, wherein the program instructions cause the processing circuit to:

obtain a next instruction address from an address table, the address table having been initialized to contain a plurality of addresses loaded by instruction logic operatively coupled to at least one of instruction fetch and instruction decode logic; and determine a specific one of the plurality of addresses using an index to select an address from the plurality of addresses in the address table.

10. The computing system according to claim 9, wherein the program instructions further cause the processing circuit to:

assign an entry in the address table to hold a next instruction address, provide an index indicative of the entry in the address table, and store a next instruction address in the assigned entry of the address table.

11. The computing system according to claim 10, wherein the address table is used for processing of branch instructions, at least one branch instruction corresponding to the index indicating the entry in the address table, the address table holding the next instruction address corresponding to the branch instruction, and the next instruction address corresponding to a return address of a branch instruction corresponding to performing a subroutine call.

12. The computing system according to claim 8, wherein the program instructions further cause the processing circuit to:

receive a program instruction and determine whether the instruction corresponds to an ADDPCIS instruction, and, responsive to the determination, to generate a plurality of internal operations adapted to be directly executed by the processing circuit, the plurality of internal operations corresponding to performing one or more processing steps of executing the ADDPCIS instruction, and to allocate at least one auxiliary register in a register file corresponding to a register file holding a plurality of architected registers, the allocated auxiliary register not corresponding to an architected register.

13. The computing system according to claim 12, wherein said plurality of internal operations comprises at least one internal operation for accessing an address table holding a plurality of addresses, the internal operation further corresponding to an index indicating a specific entry of an address table, the internal operation being further adapted to store an address from the accessed address in the auxiliary register of the register file corresponding to a register file holding a plurality of architected registers.

14. The computing system according to claim 8, wherein the program instructions further cause the processing circuit to combine the ADDPCIS instruction with a following instruction.

15. The computer program product according to claim 1, wherein the program instructions further cause the processing circuit to store a result of the adding as the value of the target register associated with the ADDPCIS instruction.

16. The computing system according to claim 8, wherein the program instructions further cause the processing circuit to store a result of the adding as the value of the target register associated with the ADDPCIS instruction.

* * * * *